(12) United States Patent
Deerman et al.

(10) Patent No.: US 7,272,746 B2
(45) Date of Patent: Sep. 18, 2007

(54) REDUNDANCY SCHEME FOR NETWORK PROCESSING SYSTEMS

(75) Inventors: James Robert Deerman, Allen, TX (US); Ramanamurthy Dantu, Richardson, TX (US); Aswinkumar Vishanji Rana, Plano, TX (US); Keung Chun Yue, Garland, TX (US)

(73) Assignee: AudioCodes Texas, Inc., Plano, TX (US)

( * ) Notice: Subject to any disclaimer, the term of this patent is extended or adjusted under 35 U.S.C. 154(b) by 901 days.

(21) Appl. No.: 10/652,265

(22) Filed: Aug. 29, 2003
(Under 37 CFR 1.47)

(65) Prior Publication Data

US 2005/0050171 A1 Mar. 3, 2005

(51) Int. Cl.
*G06F 11/00* (2006.01)
(52) U.S. Cl. .......................................... 714/4; 709/239
(58) Field of Classification Search .................... 714/4, 714/15, 18, 43
See application file for complete search history.

(56) References Cited

U.S. PATENT DOCUMENTS

| | | | |
|---|---|---|---|
| 6,018,524 A | 1/2000 | Turner et al. | |
| 6,052,718 A | 4/2000 | Gifford | |
| 6,081,511 A * | 6/2000 | Carr et al. | 370/256 |
| 6,363,319 B1 | 3/2002 | Hsu | |
| 6,392,990 B1 * | 5/2002 | Tosey et al. | 370/218 |
| 6,778,538 B2 * | 8/2004 | Landaveri et al. | 370/397 |
| 6,901,047 B1 * | 5/2005 | Griffith et al. | 370/220 |
| 6,904,286 B1 | 6/2005 | Dantu | |
| 6,940,810 B1 * | 9/2005 | Roa-Diaz | 370/217 |
| 6,957,071 B1 | 10/2005 | Holur et al. | |
| 7,006,433 B1 | 2/2006 | Dantu et al. | |
| 7,031,266 B1 | 4/2006 | Patel et al. | |
| 7,058,033 B1 | 6/2006 | Dantu et al. | |
| 7,068,624 B1 | 6/2006 | Dantu et al. | |
| 7,092,354 B2 * | 8/2006 | Jensen | 370/218 |
| 2003/0145108 A1 * | 7/2003 | Joseph et al. | 709/239 |
| 2003/0147408 A1 * | 8/2003 | Datta et al. | 370/401 |
| 2005/0027862 A1 * | 2/2005 | Nguyen et al. | 709/225 |

OTHER PUBLICATIONS

International Search Report and Written Opinion of the international Searching Authority mailed Sep. 12, 2006 for PCT Application No PCT/US04/26774, 6 pages.

* cited by examiner

*Primary Examiner*—Nadeem Iqbal
(74) *Attorney, Agent, or Firm*—Haynes and Boone, LLP

(57) ABSTRACT

A redundancy architecture is described for network processing systems which allows the network to recover from failure of a network processing system without interruption in service. The redundancy architecture allows network processing systems that use state information to associate network traffic into discrete flows, to provide system level redundancy to prevent service outages, or loss of network traffic resulting from a failure in any single network processing system. The redundancy architecture includes an out-of-band network link between the redundant network processing systems. The out-of-band network link allows the network processing systems to exchange state and other data as necessary. By maintaining the state data not only for the network traffic being processed by the network processing system, but also the state data for the network traffic being processed by its mate network processing system, either network processing system can assume the network traffic of its redundant mate in the event of a failure.

18 Claims, 7 Drawing Sheets

REDUNDANCY SCHEME FOR NETWORK PROCESSING SYSTEMS

TECHNICAL FIELD OF THE INVENTION

The present invention relates to broadband data networking equipment. Specifically, the present invention relates to a redundancy architecture for network processing systems.

BACKGROUND OF THE INVENTION

The public switched telephone network (PSTN) in the United States has become the most reliable network in the world. Unlike packetized networks such as the Internet and enterprise networks where outages occur often and are expected, customers have come to expect their telephone service to be reliable and high quality. The technology of the PSTN has been developed over decades to achieve the quality and reliability that people have come to expect of it. At the heart of the reliability of the PSTN is redundancy. Redundancy in carrier class networks is the ability of telecommunications equipment to continue operation without service outages or degradation in case of failure of any component of the telecommunications network.

With the growth of data networking, particularly the Internet, there has been a push to converge the voice network (PSTN) with the data network inside carriers. Such a convergence would save carriers enormous amounts of money by only having to maintain one network instead of two parallel networks. The problem with such a convergence has been the lack of quality of service and reliability in the Internet, particularly for real-time applications such as voice over IP (VoIP), the Internet equivalent of the PSTN phone service.

The power of internet protocol (IP) networks, such as the Internet, is their connectionless method of transporting data from source to destination. The nature of this connectionless transport is embodied in the "forward and forget" paradigm of the IP network's most powerful tool: the router. The Internet was designed to be able to route around individual pieces of equipment that may be down, which means that end to end the Internet is relatively reliable. This strength however can cause problems for real-time traffic. Since any individual packet making up a flow, or session, such as a voice call, can be routed differently from the other packets making up the call delay is often introduced, thereby degrading the quality of the voice call. Further, since internet protocol (IP) networks such as the Internet are built on a "forward and forget" paradigm, an IP network is unable to distinguish a packet of a voice call from a packet containing an email message even though the expectations in quality of service differ greatly between the two. Without information about packets or flows that the network could use to treat one packet or flow differently than the rest, the network must treat every packet and flow the same, resulting in the best efforts form of quality of service, as anyone who has ever used the Internet is familiar with.

To avoid the "forward and forget" paradigm, the network needs to be able to learn and maintain knowledge of the characteristics of the data packets and flows passing through it. Additionally, the network should learn and remember the events that are contained within the contents of those data packets or flows. With this knowledge, the network would have the information necessary to distinguish between packets and flows, and give those with particular characteristics or events treatment different from the other packets in the network. For example, if the network was able to recognize a streaming video flow, the network could assign a higher quality of service to that flow to ensure that it passed through the network in the most efficient fashion.

Any piece of equipment providing intelligence to the network will be useless unless always up and running. Outages in an intelligent network processing system would negate the advantages it provides in adding intelligence to the network. To achieve the quality and reliability expected from phone service, any network processing system handling VoIP traffic must have the redundancy capabilities to ensure always on service.

Accordingly, what is needed is a network processing system that has a redundant architecture capable of maintaining service despite an outage in any particular system or component.

SUMMARY OF THE INVENTION

The present invention provides for a redundancy architecture for network processing systems in an internet protocol (IP) network. Each network processing system processes data packets on the network and associates each data packet with a particular session, or traffic flow passing across the network. The network processing systems are able to associate the data packet with their corresponding flow by maintaining state and other information about each traffic flow being processed by the device. To prevent outages or interruption in traffic flows caused by a failure in or around one of the network processing systems, a redundancy architecture is used that allows for failover to from an inoperable device to an operable network processing system, without interruption in the traffic flows.

This redundancy is accomplished by connecting one or more network processing systems in parallel and connecting each network processing system to its redundant mates, the other network processing systems connected in parallel, via an out-of-band network link. The out-of-band network link allows all of the redundant devices to continuously, or as necessary, exchange state information on the traffic flows it is processing. Since one or more of the redundant network processing systems maintaining state for the traffic flows being processed by one of the other network processing system a failure of any network processing system results in the network traffic of the redundant network processing system being rerouted to the network processing system that has the state information for that network traffic. As a result of the redundant network processing system already maintaining the state for the network traffic of the failed network processing system the traffic can continue to be processed without any service interruption.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art will appreciate that they can readily use the disclosed conception and specific embodiment as a basis for designing or modifying other structures for carrying out the same purposes of the present invention. Those skilled in the art will also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE DRAWINGS

Figure 1A:
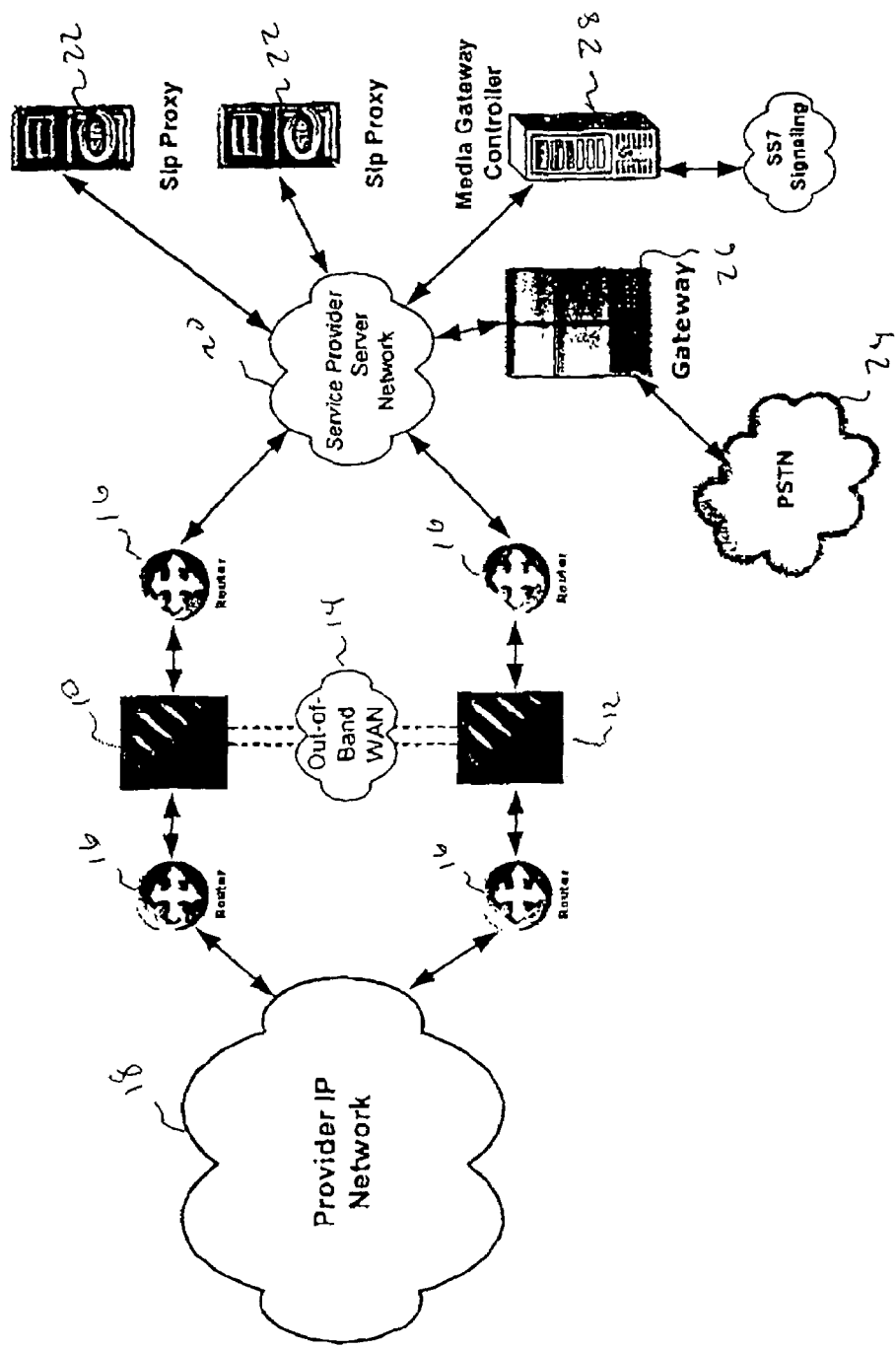
FIG. 1a is a simplified network diagram illustrating a redundancy scheme according to the present invention for a network processing system.

Referring now to FIG. 1a, a simplified network topology is shown, which illustrates a redundancy scheme for a network processing system. As will be described in more detail with reference to FIGS. 3-5, network processing systems 10 and 12 act to identify and associate individual data packets in IP networks into individual traffic flows or sessions. By being able to associate data packets into their corresponding traffic flows, network processing systems 10 and 12 can provide intelligence to the network by identifying pertinent information about the flows, such as the type of network traffic being carried by the flows and the source and destination of the flows. By understanding this type of information about each flow passing through it, network processing systems 10 and 12 are able to treat the flows to provide services such as quality of service, and security, as well as keeping detailed statistics about each flow. In order to do this, network processing systems 10 and 12 must continually maintain information about each flow over the lifetime of that flow. This information is considered to be the state for the flow.

By maintaining state information for each flow and by being able to treat each flow based on that state information, network processing systems 10 and 12 allow for high quality real time services across IP networks, such as voice over IP, and streaming video. This is only possible, however, as long as the network processing systems and their associated network equipment are functioning correctly. To insure reliability in the network, there are many levels and types of redundancy to insure that problems with a particular piece of equipment or transmission line will not interrupt service to the networks users. This level of reliability is especially important for network equipment handling real time traffic.

In accordance with this need for reliability, FIG. 1a shows a redundancy scheme for network processing systems 10 and 12 that insures that traffic passing between provider IP network 18 and service provider network 20 is not interrupted despite a failure in one of the network processing systems 10 or 12 or the routers 16 or transmission lines. As can be seen in FIG. 1a provider IP network 18 is connected to service provider network 20 through either network processing system 10 or 12 and their associated routers 16. Networks 18 and 20 can be any two IP networks that need to pass traffic between them, for example two carrier networks that are peered across network processing systems 10 and 12, or an enterprise network that is connected to a carrier network. In the example shown in FIG. 1a, provider network 18 is passing VoIP traffic to service provider network 20, which is connected to various VoIP devices, such as SIP proxy 22, media gateway controller 28, and gateway 26 which is operable connect VoIP calls to the traditional PSTN 24.

As a redundant pair, network processing system 10 and 12 can operate in either of two ways. First, the traffic can be balanced between network processing devices 10 and 12, such that while neither handles all the traffic the total amount of network traffic passing between them is less than or equal to the total capacity of a single network processing system. In the second scenario, one network processing system is used to process all the network traffic, while the second network processing system does not pass live traffic as long as the first network processing system is operating normally.

In either case, both network processing systems 10 and 12 must maintain the state of all the traffic passing across their network link. By having both boxes maintain the state of all the network traffic, in the event of a problem with one of the network processing systems or its related equipment or transmission lines all the traffic can be rerouted to the other network processing system without interruption in the network traffic and services that are currently passing through network processing systems 10 and 12.

To maintain state awareness across both network processing systems 10 and 12, they must be able to actively synchronize their state tables as changes are made, i.e. new connections or traffic flows are established or retired. To accomplish this out-of-band network link 14 is used. Out-of-band network link can be any type of network connection, such as an Ethernet connection, separate from the network traffic being processed by the network processing systems. Using this link, network processing systems 10 and 12 share state and any other information necessary to allow each of network processing systems 10 and 12 to seamlessly accept the traffic passing through the other network processing system should a problem occur.

Because network processing systems 10 and 12 are synchronized through a network connection such as out-of-band network link 14, the physical location of network processing systems 10 and 12 relative to one another is not important. The systems can either be co-located or remote from one another without changing the operation of the redundancy scheme. Remote locating the devices provides additional protection in the case of physical damage to one location, as in the case of fire or natural disaster.

Figure 1B:
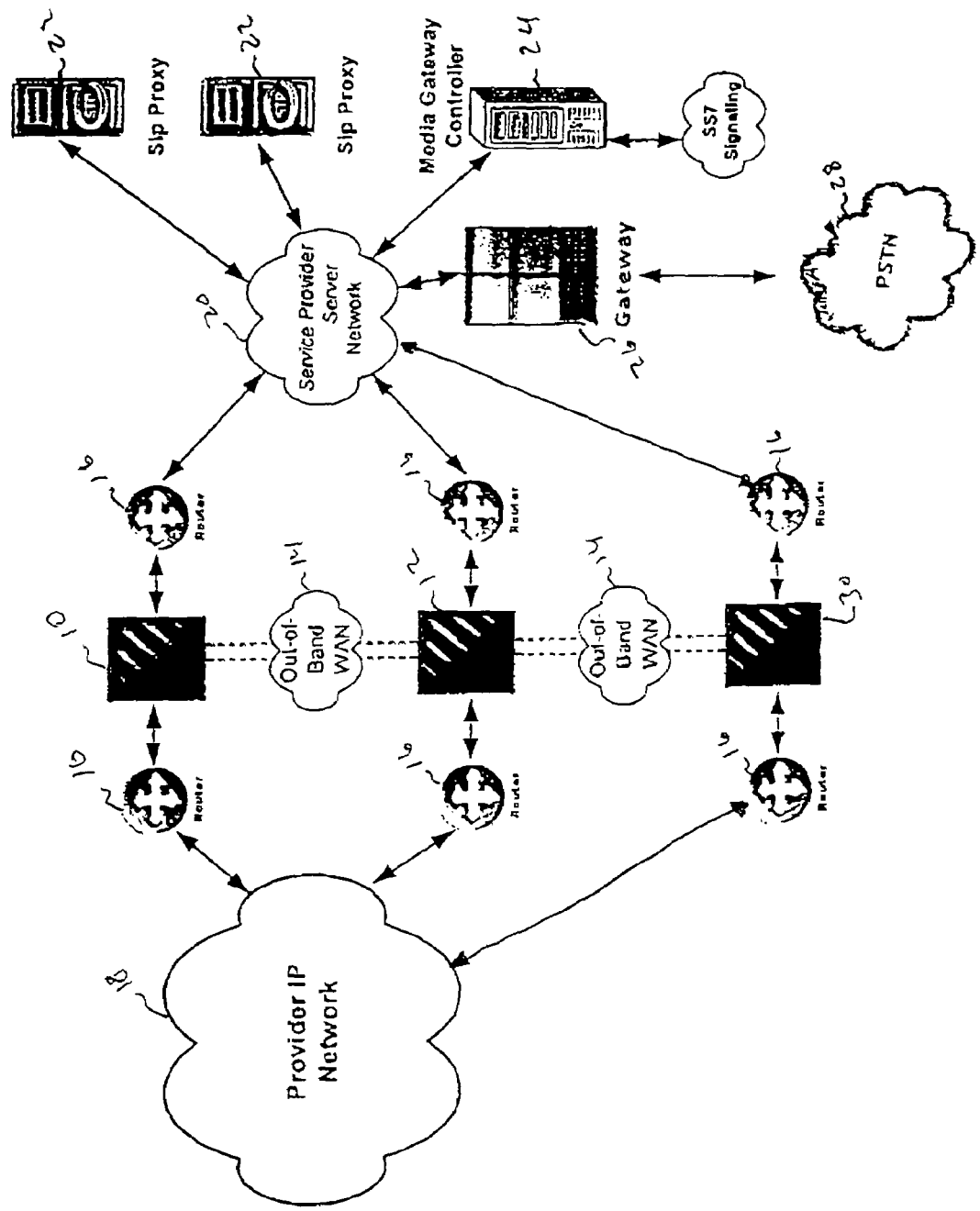
FIG. 1b is a simplified network diagram illustrating an N+1 redundancy scheme according to the present invention for a network processing system.

Referring now to FIG. 1b, a simplified network diagram is shown showing an alternate embodiment of the redundancy scheme in FIG. 1a. The redundancy scheme in FIG. 1b operates as described with respect to FIG. 1a, except now instead of a one-to-one redundancy scheme, an N-to-one redundancy scheme is shown. For illustrative purposes, FIG. 1b shows a two-to-one configuration, but one skilled in the art will recognize that the scheme is the same for any N-to-one configuration. In FIG. 1b, network processing system 12 is now dedicated to the role of a redundant system, only processing network traffic should a failure occur to network processing systems 10 or 30. Network processing systems 10 and 30 are still connected to network processing system 12 via out-of-band network link 14. Using out-of-band network link 14, network processing system is able maintain a database of the state and other information necessary to process all the traffic passing through either network processing system 10 or 30.

Figure 2:
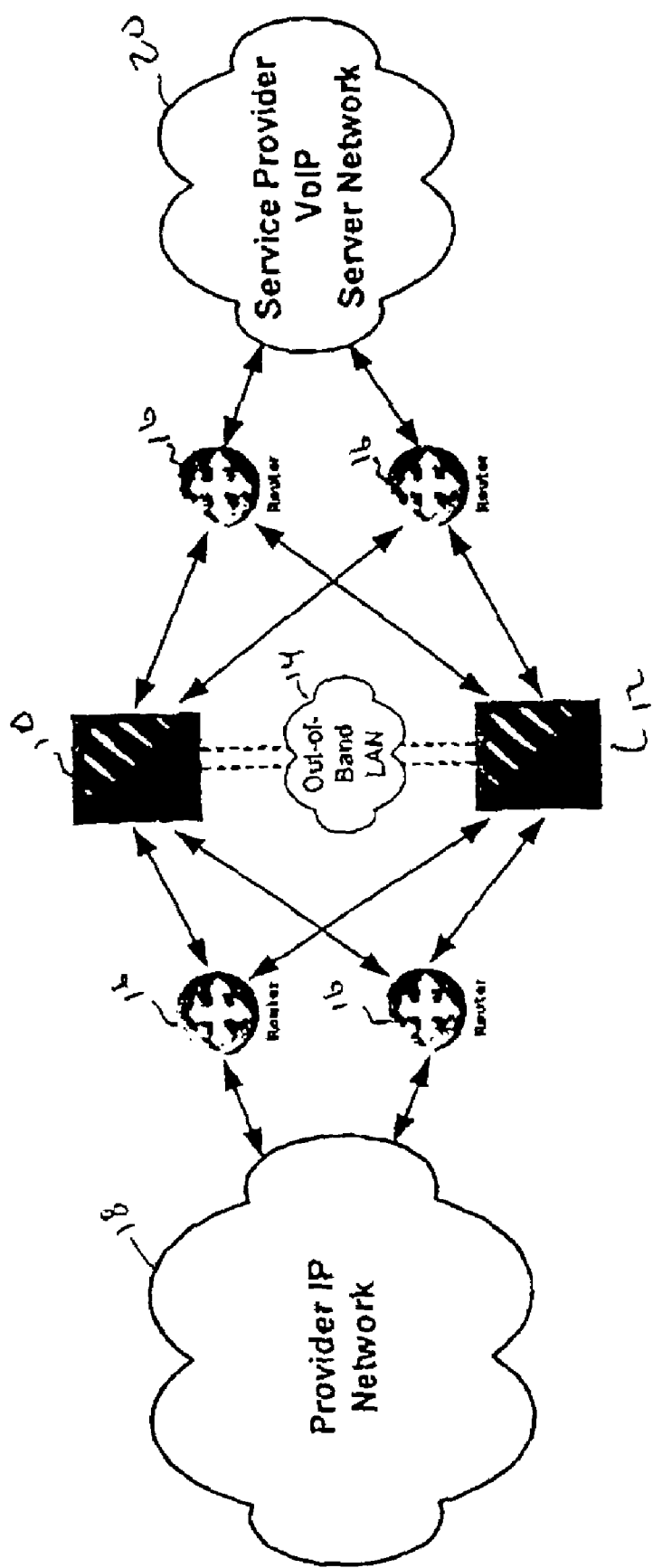
FIG. 2 is an alternate embodiment of a redundancy scheme according to the present invention for a network processing system.

Referring now to FIG. 2, a simplified network diagram is shown that illustrates another embodiment of the redundancy scheme of the present invention. The configuration shown in FIG. 2 illustrates a scheme using multiple ports on each of network processing 10 and 12 where network processing systems 10 and 12 are co-located. With this dual port configuration, network processing systems 10 and 12 can support the ability of providing backup routes to recover from a single link failure.

Figure 3:
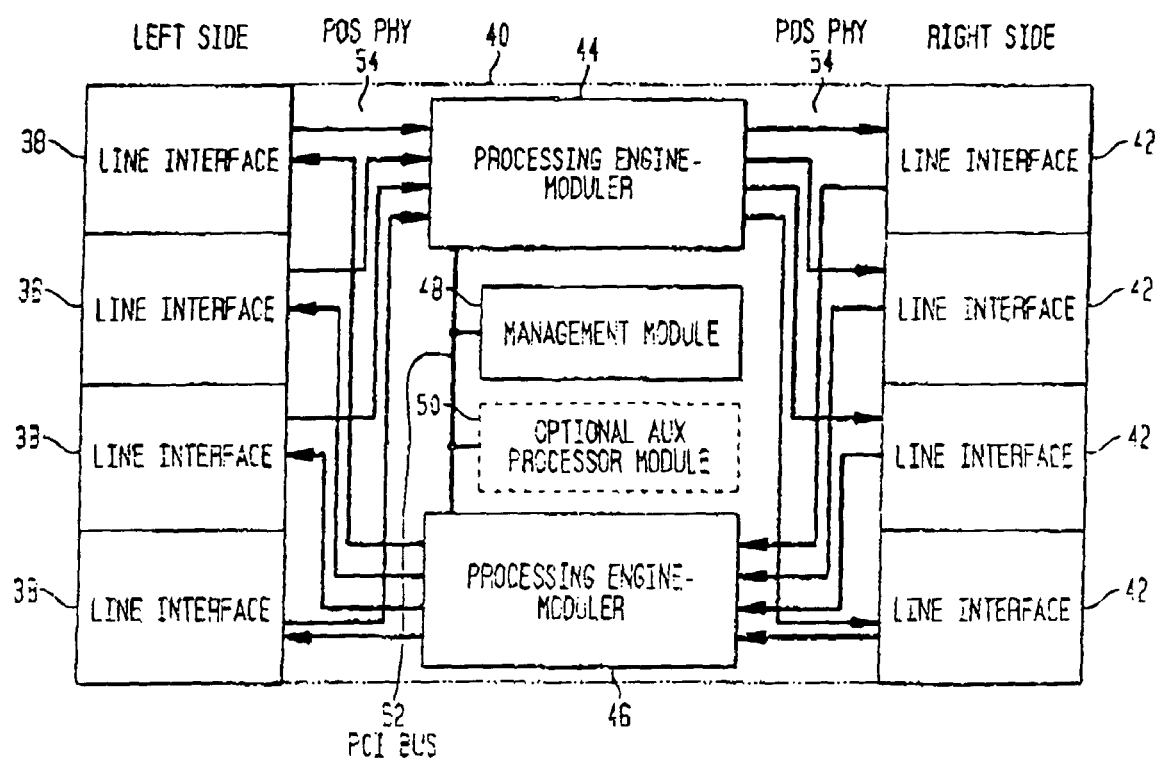
FIG. 3 is a block diagram of a network processing system according to the present invention.

Referring now to FIG. 3, one embodiment of a network processing system according to the present invention is shown. Network processing system 40 is a bi-directional system that can process information from either right line interfaces 42 which is then transmitted back onto the network through left line interfaces 38, or from left line interfaces 38 which is then transmitted back onto the network through right lines interfaces 42. Both left and right line interfaces 38 and 42 respectively, can consist of any plurality of ports, and can accept any number of network speeds and protocols, including such high speeds as OC-3, OC-12, OC-48, and protocols including 10/100 Ethernet, gigabit Ethernet, and SONET.

Figure 4:
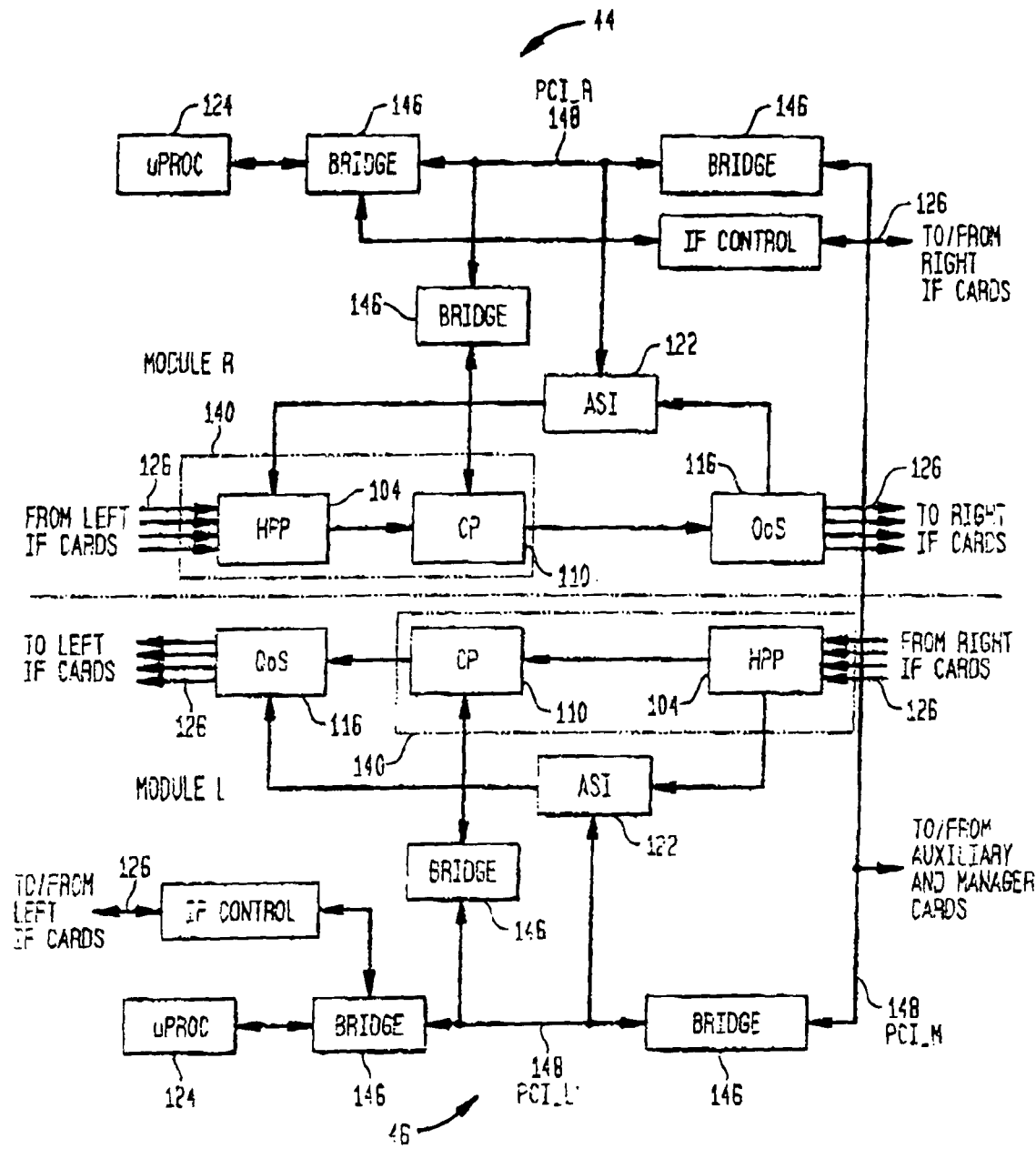
FIG. 4 is a block diagram of the processing engines shown in FIG. 3.

The line interface cards take the incoming data in the form of packets and place the data on a data bus 54 which is preferably an industry standard data bus such as a POS-PHY Level 3, or an ATM UTOPIA Level 3 type data bus. Data received on left line interfaces 38 is sent to learning state machine, or processing engine 44, while data received on right line interfaces 42 is sent to learning state machine, or processing engine 46. While network processing system 40 is bi-directional, individual learning state machines 44 and 46 within network processing system 40 are unidirectional, requiring two to process bi-directional information. Each learning state machine 44 and 46, the operation of which will be described in greater detail with reference to FIG. 4, is operable to scan the contents of each data packet, associate the data packet with a particular flow, determine the treatment for each data packet based on its contents and any state for the associated flow, and queue and modify the data packet to conform to the determined treatment. The state for flows is the information related to that flow that has been identified by network processing system 40 from packets associated with the flow that have already been processed.

An internal bus 52, which is preferably a PCI bus, is used to allow learning state machines 44 and 46 to communicate with each other, and to allow management module 48 and optional auxiliary processor module 50 to communicate with both learning state machines 44 and 46. Intercommunication between learning state machines 44 and 46 allows the processing engines to exchange information learned from a flow that can be applied to the treatment for the return flow. For example, treatment for a high-priority customer needs to be applied to both outgoing and incoming information. Since each learning state machine is unidirectional, to affect both directions of traffic, information must be shared between learning state machines.

Management module 48 is used to control the operation of each of the learning state machines 44 and 46, and to communicate with external devices which are used to load network processing system 40 with policy, QoS, and treatment instructions that network processing system 40 applies to the network traffic it processes.

Referring now to FIG. 4, one embodiment of a content processing engine used in the network processing system according to the present invention is shown. Each of the learning state machines 44 and 46 are identical as discussed, and the operation of each will be discussed generally and any description of the operation of the processing engines will apply equally to both learning state machines 44 and 46. Line interface cards 42 and 38, shown in FIG. 3, take the data from the physical ports, frames the data, and then formats the data for placement on fast-path data bus 126 which, as described, is preferably an industry standard data bus such as a POS-PHY Level 3, or an ATM UTOPIA Level 3 type data bus.

Fast-path data bus 126 feeds the data to traffic flow scanning processor 140, which includes header preprocessor 104 and content processor 110. The data is first sent to header preprocessor 104, which is operable to perform several operations using information contained in the data packet headers. Header preprocessor 104 stores the received data packets in a packet storage memory associated with header preprocessor 104, and scans the header information. The header information is scanned to identify the type, or protocol, of the data packet, which is used to determine routing information and to decode the IP header starting byte. As will be discussed below, the learning state machine, in order to function properly, needs to reorder out of order data packets and reassemble data packet fragments. Header preprocessor 104 is operable to perform the assembly of asynchronous transfer mode (ATM) cells into complete data packets (PDUs), which could include the stripping of ATM header information.

After data packets have been processed by header preprocessor 104 the data packets, and any conclusion formed by the header preprocessor, such as QoS information, are sent on fast-data path 126 to the other half of traffic flow scanning engine 140, content processor 110. The received packets are stored in packet storage memory (not shown) while they are processed by content processor 110. Content processor 110 is operable to scan the contents of data packets received from header preprocessor 104, including the entire payload contents of the data packets. The header is scanned as well, one goal of which is to create a session id using predetermined attributes of the data packet.

In the preferred embodiment, a session id is created using session information consisting of the source address, destination address, source port, destination port and protocol, although one skilled in the art would understand that a session id could be created using any subset of fields listed, or any additional fields in the data packet, without departing from the scope of the present invention. When a data packet is received that has new session information the header preprocessor creates a unique session id to identify that particular traffic flow. Each successive data packet with the same session information is assigned the same session id to identify each packet within that flow. Session ids are retired when the particular traffic flow is ended through an explicit action, or when the traffic flow times out, meaning that a data packet for that traffic flow has not been received within a predetermined amount of time. While the session id is discussed herein as being created by the header preprocessor 104, the session id can be created anywhere in traffic flow scanning engine 140 including in content processor 110.

The contents of any or all data packets are compared to a database of known signatures, and if the contents of a data packet, or packets, match a known signature, an action associated with that signature and/or session id can be taken by the processing engine. Additionally, content processor 110 is operable to maintain state awareness throughout each individual traffic flow. In other words, content processor 110 maintains a database for each session which stores state information related to not only the current data packets from a traffic flow, but state information related to the entirety of the traffic flow. This allows network processing system 40 to act not only based on the content of the data packets being scanned but also based on the contents of the entire traffic flow.

Once the contents of the packets have been scanned and a conclusion reached by traffic flow scanning engine 140, the packets and the associated conclusions of either or both the header preprocessor 104 and the content processor 110 are sent to quality of service (QoS) processor 116. QoS processor 116 again stores the packets in its own packet storage memory for forwarding. QoS processor 116 is operable to perform the traffic flow management for the stream of data packets processed by network processing system 40. QoS processor contains engines for traffic management, traffic shaping and packet modification.

QoS processor 116 takes the conclusion of either or both of header preprocessor 104 and content processor 110 and assigns the data packet to one of its internal quality of service queues based on the conclusion. The quality of service queues can be assigned priority relative to one another, or can be assigned a maximum or minimum percentage of the traffic flow through the device. This allows QoS processor 116 to assign the necessary bandwidth to traffic flows such as VoIP, video and other flows with high quality and reliability requirements, while assigning remaining bandwidth to traffic flows with low quality requirements such as email and general web surfing to low priority queues. Information in queues that do not have the available bandwidth to transmit all the data currently residing in the queue according to the QoS engine is selectively discarded, thereby removing that data from the traffic flow.

The quality of service queues also allow network processing system 40 to manage network attacks such as denial of service (DoS) attacks. Network processing system 40 can act to qualify traffic flows by scanning the contents of the packets and verifying that the contents contain valid network traffic between known sources and destinations. Traffic flows that have not been verified because they are from unknown sources, or because they are new unclassified flows, can be assigned to a low quality of service queue until the sources are verified or the traffic flow is classified as valid traffic. Since most DoS attacks send either new session information, data from spoofed sources, or meaningless data, network processing system 40 would assign those traffic flows to low quality traffic queues. This ensures that the DoS traffic would receive no more than a small percentage (i.e. 5%) of the available bandwidth, thereby preventing the attacker from flooding downstream network equipment.

The QoS queues in QoS processor 116 (there are 64 k queues in the present embodiment of the QoS processor, although any number of queues could be used) feed into schedulers (1024 in the present embodiment), which feed into logic ports (256 in the present embodiment), which send the data to flow control port managers (32 in the present embodiment) which can correspond to physical egress ports for the network device. The traffic management engine and the traffic shaping engine determine the operation of the schedulers and logic ports in order to maintain traffic flow in accordance with the programmed parameters.

QoS processor 116 also includes a packet modification engine, which is operable to modify, add, or delete bits in any of the fields of a data packet. This allows QoS processor 116 to change DiffServ bits, or to place the appropriate MPLS shims on the data packets for the required treatment. The packet modification engine in QoS processor 116 can also be used to change information within the payload itself if necessary. Data packets are then sent along fast-data path 126 to output to the associated line interfaces, where it is converted back into an analog signal and placed on the network.

As with all network equipment, a certain amount of network traffic will not be able to be processed along fast-data path 126. This traffic will need to be processed by on-board microprocessor 124. The fast-path traffic flow scanning engine 140 and QoS processor 116 send packets requiring additional processing to flow management processor 122, which forwards them to microprocessor 124 for processing. The microprocessor 124 then communicates back to traffic flow scanning engine 140 and QoS processor 116 through flow management processor 122. Flow management processor 122 is also operable to collect data and statistics on the nature of the traffic flow through the processing engine 40. Bridges 146 are used between elements to act as buffers on PCI buses 148 in order to prevent the loss of data that could occur during a flood of the PCI bus.

As can be seen from the description of FIG. 4, learning state machines 44 and 46 allow the entire contents of any or all data packets received to be scanned against a database of known signatures. The scanned contents can be any variable or arbitrary length and can even cross packet boundaries. The abilities of learning state machines 44 and 46 allow the construction of a network device that is intelligent and state-aware, and gives the network device the ability to operate on data packets based not only on the contents of that data packet, but also on the contents of previous data packets from the same flow.

Figure 5:
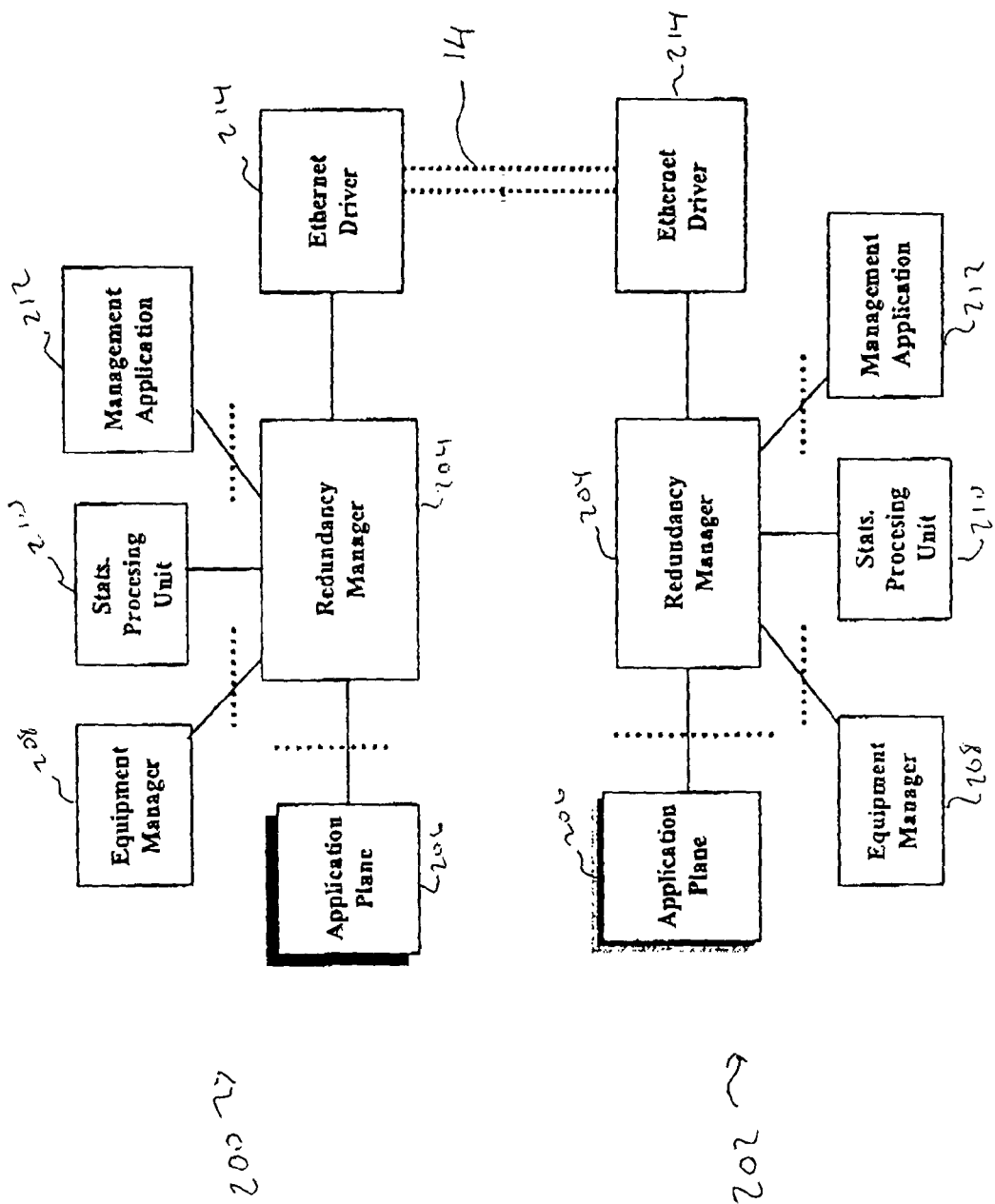
FIG. 5 is a block diagram a block diagram of an embodiment of the software in the network processing system implementing the redundancy scheme of the present invention.

Referring now to FIG. 5, a block diagram of the preferred embodiment of the software modules used to implement the redundancy scheme of the present invention is shown. Software modules 200 and 202 correspond to a redundant pair of network processing systems, such as network processing systems 10 and 12 from FIG. 1a. While a redundant pair of network processing systems are described with respect to FIG. 5, any number of redundant systems could be implemented as described with reference to FIG. 1b. The components of software modules 200 and 202 are identical and will be described interchangeably.

Redundancy manager 204 communicates with other redundancy manager modules using Ethernet driver 214 and out-of-band network link 14 described with respect to FIGS. 1a, 1b, and 2. Redundancy manager 204 also communicates to the other processes running on the network processing system. Application plane 206 interfaces to redundancy manager 204 and provides the state and other information to send to the redundant network processing system and receives the state and other information from the other network processing system to maintain synchronization.

Equipment manager 208 monitors the condition of the redundant devices and notifies redundancy manager 204 if a change needs to be made to the status of the network processing systems, such as initiating recovery mode. Stat processing unit 210 manages and tracks the timers used to manager communications between the redundant network processing systems. The timers indicate when information can be sent across out-of-band network link 14, as well as monitoring its responses are being received appropriately from the redundant network processing systems. Management application 212 monitors alarm and fault conditions for the entire network processing system, including redundant software modules 200 and 202.

Figure 6:
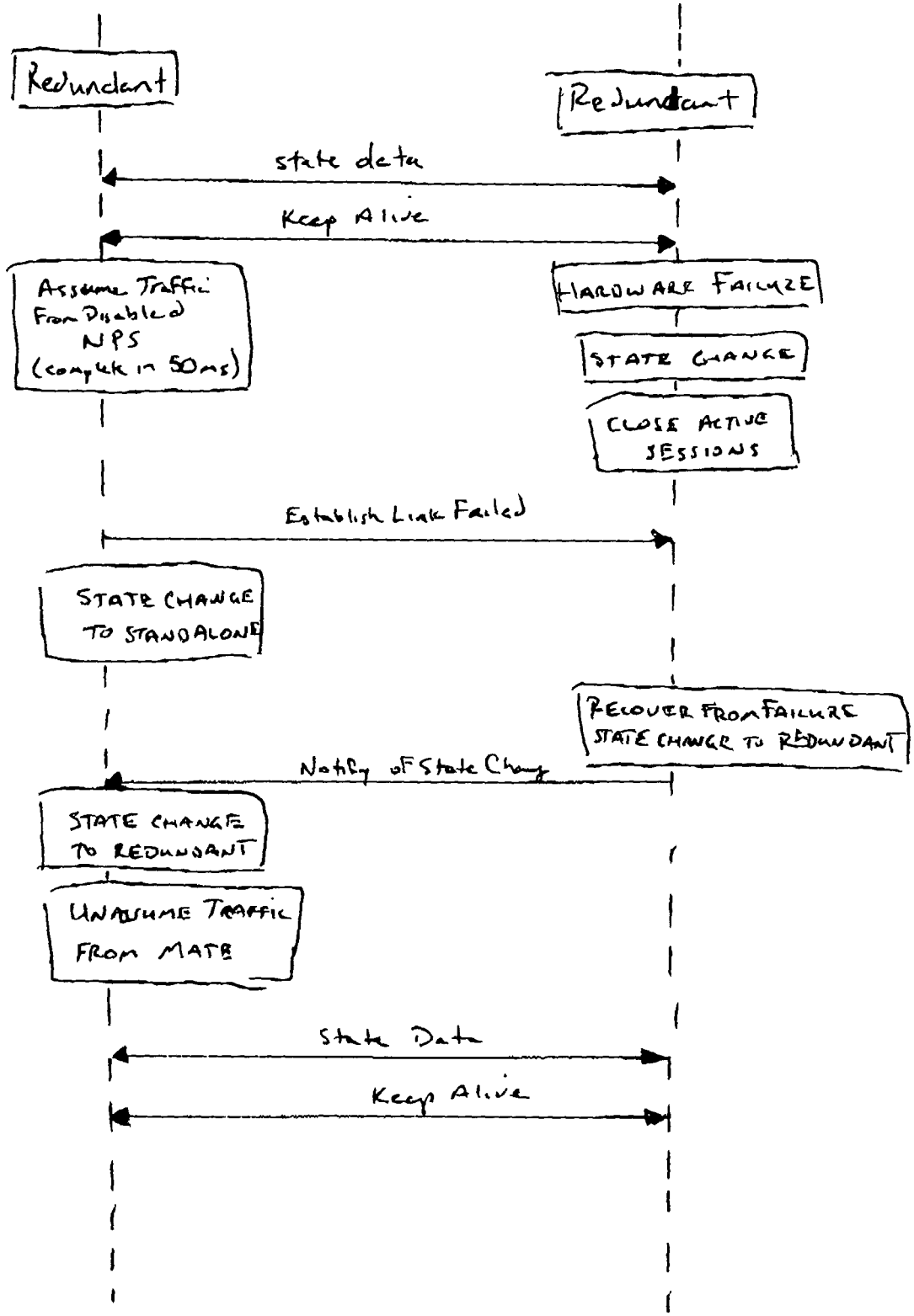
FIG. 6 is a signaling and state diagram showing the preferred embodiment of signaling between redundant network processing systems for failure and recovery.

Referring now to FIG. 6, a state and signaling diagram is discussed showing the preferred embodiment of the state of a pair of redundant network processing systems and the signaling between them during a failure of one of the systems and subsequent recovery. Both network processing systems, such as network processing systems 10 and 12 from FIG. 1a, begin in a redundant state meaning both are operable and capable of processing network traffic. In the redundant state both network processing systems exchange state and other data as is required to ensure that both network processing systems have the required information to handle the network traffic passing through one or both of them. The network processing systems also exchange messages notifying each other of their operable state, shown as a "keep alive" message.

Once a hardware failure in network processing system B, NPS-B, is detected either from signaling from one of the routers 16 from FIG. 1a, or through the lack of proper signaling detected by network processing system A, NPS-A, network processing system A assumes all the network traffic from network processing system B. This must occur within 50 milliseconds to prevent interruption to real time media passing through the systems. Network processing system A then attempts to reestablish a link with network processing system B. When that fails, network processing system A changes its state to standalone mode. During this same time, when network processing system B detects the failure, it changes its state to a disabled state and closes all of the active sessions in its state database.

This configuration continues until network processing system B recovers from its failure and is able to change its state back to a redundant state. Network processing system B then notifies network processing system A of the change and network processing system A also returns to a redundant state. Network processing system A then unassumes the network traffic of network processing systems B. Once both boxes are operating properly in redundant mode, they again begin the exchange of state and other information as necessary and exchange the "keep alive" messages.

While FIG. 6 refers to a hardware failure in one of the network processing system, any issue or failure that prevents one of the network processing system from operating properly can trigger the failover mode. One skilled in the art will understand that while FIG. 6 makes reference to a one-to-one redundant configuration, any of the redundancy configurations contemplated by the present invention, including those described with reference to FIGS. 1a, 1b, and 2 could use the same procedure to provide continuous service to the network.

While the header preprocessor, the QoS processors, and the flow management processor described with reference to FIGS. 3 and 4 can be any suitable processor capable of executing the described functions, in the preferred embodiment the header preprocessor is the Fast Pattern Processor (FPP), the QoS processor is the Routing Switch Processor (RSP), and the flow management processor is the ASI processor, all manufactured by the Agere Division of Lucent Technologies, Austin Tex. The microprocessor described with reference to FIG. 3 and the management module of FIG. 4 could be any suitable microprocessor including the PowerPC line of microprocessors from Motorola, Inc., or the X86 or Pentium line of microprocessors available from Intel Corporation. Although particular references have been made to specific protocols, implementations and materials, those skilled in the art should understand that the network processing system, both the "bump-in-the-line" and the routing apparatus can function independent of protocol, and in a variety of different implementations without departing from the scope of the invention.

Although the present invention has been described in detail, those skilled in the art should understand that they can make various changes, substitutions and alterations herein without departing from the spirit and scope of the invention in its broadest form.

We claim:

1. A redundancy architecture for network processing systems in a network, the network containing network traffic consisting of a plurality of data packets, the plurality of data packets forming a plurality of flows, the redundancy architecture comprising:

at least a first network processing system operable to receive data packets from the network and further operable to send processed data packets back onto the network and including, a processing engine operable to learn and maintain state for particular flows, wherein the processing engine assigns an identifier to one or more of the particular flows and associates each data packet belonging to that flow with the identifier, the processing engine further operable to identify characteristics of one or more of the particular flows and to store those characteristics in a state database in the processing engine, the network processing system further including a network link; and a second network processing system which includes a second processing engine with a second database and a second network link connected to the network link and operable to allow communication between the first network processing system and the second network processing system;

wherein the second network processing system is connected in parallel with the first network processing system and is operable to receive all the state entries from the first network processing system, such that when a failure occurs in the first network processing system the network traffic on the first network processing system is switched to the second network processing system.

2. The redundancy architecture of claim 1 wherein the first and second network processing systems share the network traffic while maintaining the state entries for both the first and second network processing systems.

3. The redundancy architecture of claim 1 wherein the first network processing system processes all the network traffic, while the second network processing system maintains all the state entries for the first network processing system.

4. The redundancy architecture of claim 1 further comprising at least a third network processing system connected in parallel with the first and second network processing systems, wherein the second network processing system maintains the state entries for both the first and third network processing systems, such that when a failure occurs in either the first or third network processing system the network traffic on the failed network processing system is switched to the second network processing system.

5. The redundancy architecture of claim 1 wherein first and second network processing systems are co-located.

6. The redundancy architecture of claim 5 wherein the network processing system are configured in a dual port configuration to provide protection against link failures.

7. The redundancy architecture of claim 1 wherein the first and second network processing systems are remotely located.

8. The redundancy architecture of claim 1 wherein the network link is an Ethernet connection.

9. The redundancy architecture of claim 1 wherein the first and second network processing systems are automatically returned to a redundant state when the first network processing system returns to an operational state.

10. A redundancy architecture for network processing systems in a network, the network containing network traffic consisting of a plurality of data packets, the plurality of data packets forming a plurality of flows, the redundancy architecture comprising:

a first network processing system operable to receive a first set of data packets from the network and further operable to send the first set of processed data packets back onto the network and including, a processing engine operable to learn and maintain state for a first set of flows corresponding to the first set of data packets, wherein the processing engine assigns an identifier to one or more of the first set of particular flows and associates each of the first set of data packets belonging to that flow with the identifier, the processing engine further operable to identify characteristics of one or more of the first set of particular flows and to store those characteristics in a first state database in the processing engine, the network processing system further including a network link; and a second network processing system operable to receive a second set of data packets from the network and further operable to send the second set of processed data packets back onto the network and including, a processing engine operable to learn and maintain state for a second set of flows corresponding to the second set of data packets, wherein the processing engine assigns an identifier to one or more of the second set of particular flows and associates each of the second set of data packets belonging to that flow with the identifier, the processing engine further operable to identify characteristics of one or more of the second set of particular flows and to store those characteristics in a second state database in the processing engine, the network processing system further including a network link;

wherein the first and second network processing systems are connected in parallel such that substantially all the first state database is created in the second network processing system and all of the second state database is created in the first network processing system, such that when a failure occurs in the first network processing system the first set of data packets is switched to the second network processing system.

11. The redundancy architecture of claim 10 wherein the first and second network processing systems share the network traffic while maintaining the state entries for both the first and second network processing systems.

12. The redundancy architecture of claim 10 wherein the first network processing system processes all the network traffic, while the second network processing system maintains all the state entries for the first network processing system.

13. The redundancy architecture of claim 10 further comprising at least a third network processing system connected in parallel with the first and second network processing systems, wherein the second network processing system maintains the state entries for both the first and third network processing systems, such that when a failure occurs in either the first or third network processing system the network traffic on the failed network processing system is switched to the second network processing system.

14. The redundancy architecture of claim 10 wherein first and second network processing systems are co-located.

15. The redundancy architecture of claim 14 wherein the network processing system are configured in a dual port configuration to provide protection against link failures.

16. The redundancy architecture of claim 10 wherein the first and second network processing systems are remotely located.

17. The redundancy architecture of claim 10 wherein the network link is an Ethernet connection.

18. The redundancy architecture of claim 10 wherein the first and second network processing systems are automatically returned to a redundant state when the first network processing system returns to an operational state.

* * * * *